United States Patent [19]
Hollander et al.

[11] Patent Number: 5,984,729
[45] Date of Patent: Nov. 16, 1999

[54] CONNECTOR WITH PROTECTION FROM RADIATED AND CONDUCTED ELECTROMAGNETIC EMISSIONS

[75] Inventors: Milton Bernard Hollander; William Earl McKinley, both of Stamford; Russell Stewart, Fairfield, all of Conn.

[73] Assignee: Omega Engineering, Inc., Stamford, Conn.

[21] Appl. No.: 09/131,411

[22] Filed: Aug. 10, 1998

Related U.S. Application Data

[60] Division of application No. 08/751,594, Nov. 18, 1996, Pat. No. 5,833,496, which is a continuation-in-part of application No. 08/710,683, Sep. 24, 1996, which is a continuation-in-part of application No. 08/605,607, Feb. 22, 1996, abandoned.

[51] Int. Cl.⁶ .................................................. H01R 33/00
[52] U.S. Cl. ............................................ 439/620; 439/696
[58] Field of Search .......................... 439/620, 695, 439/696, 651, 913

[56] References Cited

U.S. PATENT DOCUMENTS

| | | | |
|---|---|---|---|
| 2,030,856 | 2/1936 | Dillig | 439/695 |
| 2,410,098 | 10/1946 | Muller | 439/913 |
| 3,052,770 | 9/1962 | Divilo | 439/913 |
| 3,229,242 | 1/1966 | Finney et al. | 439/913 |
| 3,855,569 | 12/1974 | Tymkewicz | 439/695 |
| 4,329,665 | 5/1982 | Kawai et al. | 439/695 |
| 5,476,394 | 12/1995 | Sugihara et al. | 439/620 |
| 5,492,482 | 2/1996 | Lockman et al. | 439/913 |

FOREIGN PATENT DOCUMENTS

| | | | |
|---|---|---|---|
| 1077746 | 3/1960 | Germany | 439/696 |
| 0227371 | 9/1989 | Japan | 439/620 |
| 0236111 | 5/1945 | Switzerland | 439/696 |

*Primary Examiner*—Paula Bradley
*Assistant Examiner*—Tho Dac Ta
*Attorney, Agent, or Firm*—William A. Drucker

[57] ABSTRACT

This invention provides an electrical connection connector, particularly for devices having a low signal level, for example, thermocouple sensor circuits. The connector has plural terminals for attachment of electrical leads; and connections for engagement electrically with mating conductors of an electrical component; and plural bodies of ferrite material inside the connector housing. There is an electrically conductive element passing axially through each ferrite body and having ends of each element connected respectively to the terminals and to the connections to complete a circuit therebetween.

9 Claims, 3 Drawing Sheets

CONNECTOR WITH PROTECTION FROM RADIATED AND CONDUCTED ELECTROMAGNETIC EMISSIONS

This is a division of application Ser. No. 08/751,594 filed Nov. 18, 1996 now U.S. Pat. No. 5,833,496, which is a CIP of Ser. No. 08/710,683 filed Sep. 24, 1996 which is a CIP of Ser. No. 08/605,607 filed Feb. 22, 1996 now abandoned.

This disclosure contains no right to any inventions made under federally-sponsored research and development.

BACKGROUND OF THE INVENTION

1. Field of the Invention

This invention relates generally to connectors, whether single conductor or multiple conductor, and whether intended for use as single connector items, e.g. for making a separable connection to a piece of electronic apparatus, or as a part or parts of a multiple-part line connector assembly, e.g. male and female interconnecting plug and socket items.

More specifically, the invention relates to connectors which provide for suppression of radiated and/or conducted electromagnetic emissions which would be detrimental to proper use of apparatus in which the connector is included. In particular the invention is applicable to fields of use wherein there is necessity for including an electrical or electronic circuit or device having a relatively low signal level which might be adversely affected by such stray emissions, for example thermocouple sensor circuits.

2. Description of the Prior Art

In the prior art of connectors there are disclosures of the use of ferrite material in the following:

(I) U.S. Patents assigned to AMP Inc: U.S. Pat. Nos. 4,699,590, 4,359,620, 3,789,263, Re29,258, 3,735,705, 3,987,380, 4,936,800.

(II) U.S. Patent assigned to The Whitaker Corp: U.S. Pat. No. 5,219,305.

(III) U.S. Patent William Baird Fritz U.S. Pat. No. 3,743,978.

(IV) U.S. Patent assigned to Stanford Research Institute and Amplex Corporation: U.S. Pat. No. 3,533,948.

(V) Un-examined Japanese Patent Application, AMP Inc., 90-032246/05 JO 1279-584-A discloses an electrical connector which has a noise filter with a ferrite head fitted to a terminal lead formed by a central conductor of a feed-through capacitor.

(VI) German Patent assigned to AMP Inc., Auslegeschrift No. 2,058,419 discloses a method for the manufacturer of a high frequency filter from a ferrite tube, which is in the form of a highly compressed tube and which is bonded on its outer surface with a covering of dielectric material, the layer of dielectric material carrying an electrode in the form of a metallic outer sleeve, and a further electrode is provided in similar manner on the inside of the ferrite tube, characterised in that the covering (6) of dielectric material is laid down directly into the outer surface of the ferrite tube (5) by electrophoresis.

SUMMARY OF THE INVENTION

It is known that electrical signals carried by connectors, or adjacent apparatus, may be subject to electromagnetic interference as the result of induced signals picked up from the electromagnetic radiation of adjacent electrical equipment. Such interference results from the leads, to the connector or within the connector, acting as an antenna which senses stray electromagnetic radiation.

Various efforts have been made to avoid or suppress the result of such interference, but such efforts have been found to be inconvenient and/or expensive to implement or both. For example, it has been found in the past that interference from stray signals can be avoided by encapsulating leads in sheaths of RFI (radio frequency interference shielding) material, or by determining the strength of nearby stray signal fields and then moving all such nearby sources to a physical distance from the leads that has been calculated to prevent possibility of undesired signals being picked up by electromagnetic induction. It can be seen, readily, that such preventive methods and techniques are indeed costly and inconvenient. Other attempts to reduce or avoid interference from stray signals have involved the use of ferrite cores. Hitherto such uses have in some cases required additional circuit elements, such as insertion of a jumper cable having a permanently-included ferrite core, in series with the main conductors in the circuit; or awkwardly and inconveniently surrounding one or more of the circuit conductors with separately applied ferrite cores. Again, it is known to use ferrite beads mounted conveniently on circuit boards or moulded into connectors used with computer monitors.

It is established practice, in industries that make use of thermocouple sensors, to couple the sensor into a related electrical circuit by means of an electrical connector. When for example thermocouples are connected to instruments such as panel meters, controllers and transmitters, the input signal from the sensor or transducer usually travels substantial distances along fine gauge electrically conductive wire leads. The length and nature of such leads and the environment in which they must function often create conditions that favour occurrence of stray emissions. In many cases, the leads or signal wires from a sensor or thermocouple are first attached, for convenience, to an electrical connector, for coupling to an instrument or the like. As soon as the conductors of the connector are electrically coupled to the circuit, stray EMI emissions may be conducted into the circuit. Of particular importance are thermocouple connectors, which are particularly susceptible because of the long lead conductive path of the conductors themselves and the high input impedance of the instrumentation.

The term "ferrite" as commonly understood in the electronics field, denotes a particulate material having one or more oxides of iron in particulate form in a carrier. This usage of the term "ferrite" is to be distinguished for the usual dictionary definition which is a generic name for a number of oxides of iron. In this specification, the term "ferrite" is to be understood as including within its scope any suitable material having an absorption and/or shielding effect as concerns electromagnetic waves which may be emitted at or adjacent to a zone of completion of an electrical circuit. Known ferrite elements consist of ferrite material sintered into a convenient shape. Other known "ferrite" materials for the suppression of electromagnetic interference are nickel-zinc compositions and manganese-zinc materials, of different compositions to permit selection of an optimum type for a given application; pressed parts, components, and powders are known.

OBJECTS OF THE INVENTION

Accordingly it is an object of this invention to provide means associated with an electrical connector that is capable of filtering stray signals which may be induced in the lead or leads of the connector.

It is another object of this invention to provide apparatus which eliminates the effects of undesired stray signals in circuits which include a connector or connectors, that is uncomplicated in design, and that is relatively simple and inexpensive to produce.

It is still another object of this invention to provide means associated with an electrical connector, for eliminating the effects of undesired stray signals in the circuit or circuits in which the connector is included, that is easily adaptable to single lead or multi-lead connectors.

Another and further object of this invention is to provide means associated with an electrical connector for eliminating the effects of undesired stray signals in its circuit or circuits, that can be manufactured easily in various configurations to accommodate differing circuit requirements.

And yet another and further objective of this invention is to provide means, associated with an electrical connector, for the elimination of the effects of undesired stray signals in its circuit or circuits, which can be readily changed and substituted in the connector by other such means of a different rating or effectiveness according to requirement.

It has been found that so-called "soft" ferrite elements, as they are known in this art, when properly included in an electrical circuit, act as an electromagnetic "sponge" to absorb and dissipate the unwanted electromagnetic wave energy of the conductor or conductors with which the ferrite element is associated.

The purpose of making the carriers removable is to adjust the characteristics of the ferrite core to suppress particular frequencies and magnitudes of EMI radiation encountered.

DETAILED DESCRIPTION OF THE INVENTION

Figure 1:
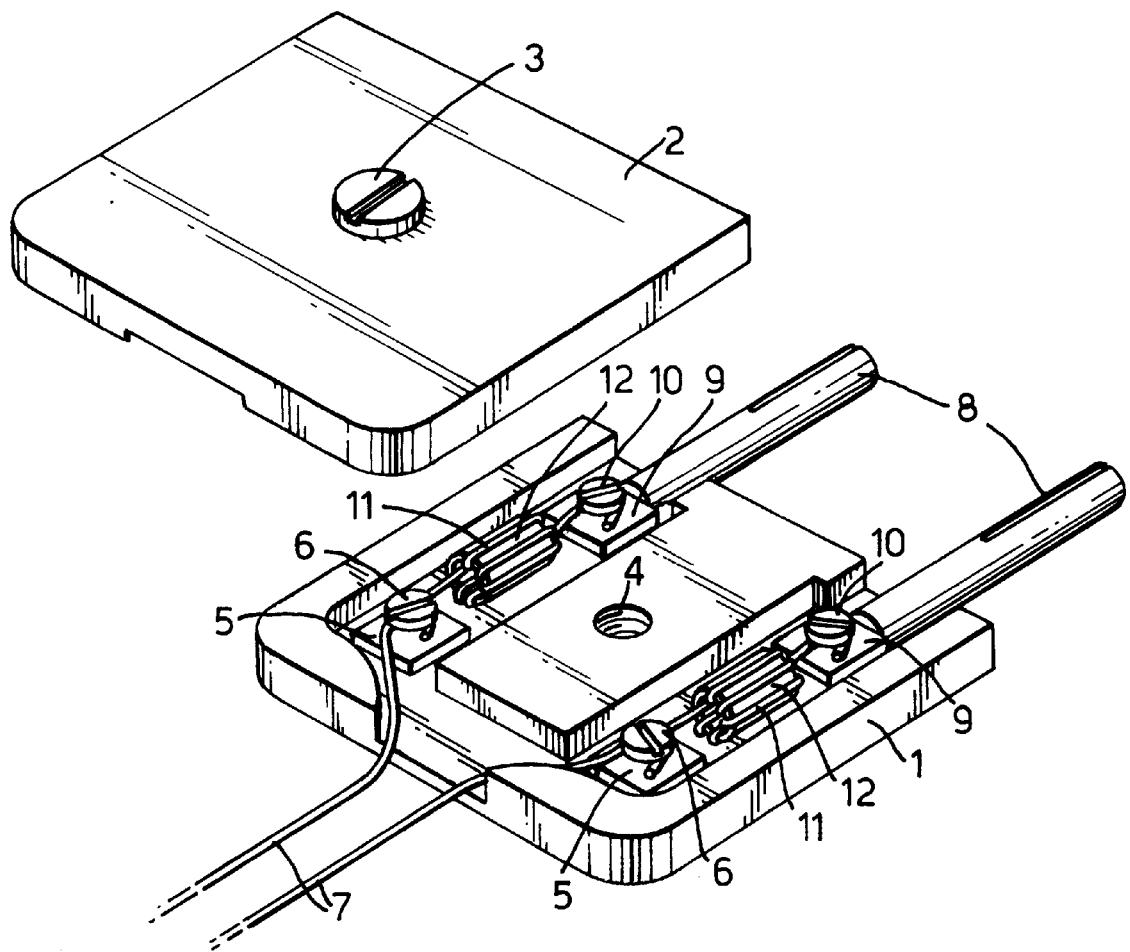
FIG. 1 is a perspective elevation of a two-pin connector having a first form of ferrite-based filter element in both of its conductive paths.

Referring to FIG. 1 of the drawings, there is shown a two-pin electrical connector having a base 1 and a cover 2 which can be secured in position on the base 1 by a screw 3 engaged in a threaded hole 4 of the base 1. In the base 1 there are mounted respective terminal blocks 5 having screws 6 serving for securing, to the blocks 5, the respective wires 7 of, say, a thermocouple pair. Pins 8 are attached to respective mountings 9 having screws 10 for the securing of one end of a winding 11 formed about a hollow cylindrical core 12 of ferrite material. The other end of each winding 11 is either secured by the respective screw 6 to its terminal block 5, or is welded to the terminal block 5. In this construction, the central longitudinal axis of the core 12 is generally aligned with the central longitudinal axis of the pins 8.

Figure 2:
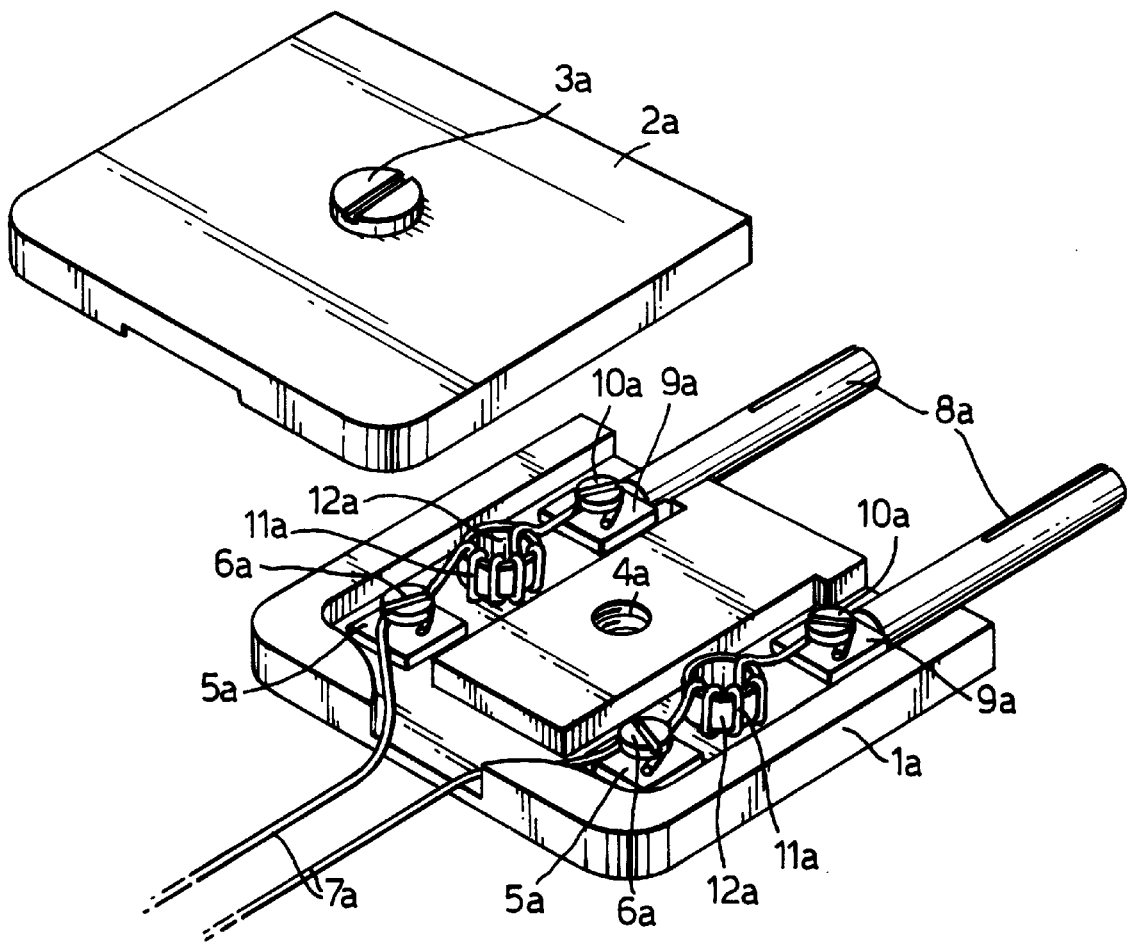
FIG. 2 is a perspective elevation of a two-pin connector having a second form of ferrite-based filter element on both of its conductive paths.

Referring now to FIG. 2, there is seen a two-pin electrical connector in which the items denoted by reference numerals 1a through 10a are identical to those described with reference to references 1 through 10 of FIG. 1. However, in the construction of FIG. 2, the winding 11a is made about a relatively shorter hollow cylindrical core 12a of ferrite material, said core and winding having their central longitudinal axis at right-angles to the central longitudinal axis of the pins 8.

Figure 3:
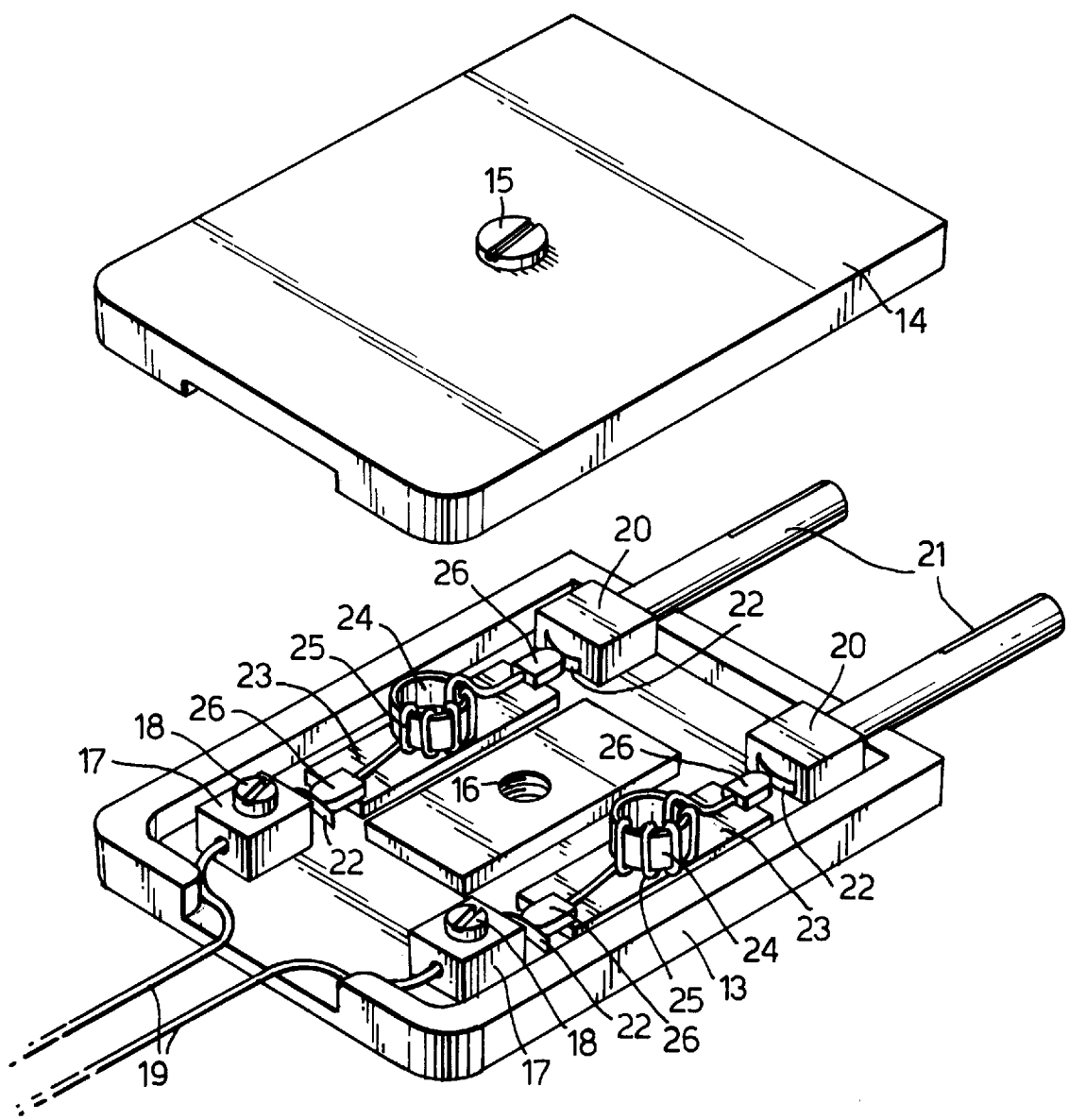
FIG. 3 is a perspective elevation of a two-pin connector having the ferrite-based filter elements seen in FIG. 2 arranged on individual removable and replaceable carriers or mountings for each of its conductive paths.

Referring now to FIG. 3 there is seen a two-pin electrical connector having a base 13 and a cover 14 which can be secured in position on the base 13 by a screw 15 engaged in a threaded hole 16 of the base 13. In the base 13 there are mounted two terminal blocks 17 each having a screw 18 which can be used to secure the end of a respective wire 19, say of a thermocouple pair. At the other end of the base 13 there are mounted two blocks 20 each carrying a pin 21. On a face of each of the blocks 17,17 and 20,20 there are provided spring leaf contactors 22. In the gap between the respective pairs of aligned blocks 17 and 20 there is disposed a carrier or baseboard 23 carrying a ferrite core 24 of cylindrical shape and about which is formed a winding 25 which has its two ends attached to respective brushes 26 secured on the baseboard 23. The spacing of tie brushes 26 on each baseboard 23 is such that the brushes 26 engage against, and slightly compress, the spring contactors 22 with which they are aligned. In this embodiment, the cores 24 and windings 25 have their central longitudinal axis at right-angles to the central longitudinal axis of the pins 21.

The device of this invention if particularly applicable in situations, e.g. using dissimilar metals or RTD (Resistance Temperature Devices) applications, e.g. copper, where the signals involved, say in apparatus utilising dissimilar metals, are of low voltage, say less than 10 volts and especially in the very low voltage range of millivolts or microvolts, and with signal currents of less than 20 milliamps, and with electrically polarised or DC type signals and with slow speed of response.

For example, the connector of this invention may be a thermocouple connector with dissimilar metals, and colour-coded.

We claim:

1. An electrical connector comprising within a common housing:

a plurality of separate devices, each including terminal means for attachment of a terminal lead;

plural conductive connecting means having a first longitudinal axis for engagement electrically with mating conductive means of an electrical component;

said separate devices each comprising a body of ferrite material having a second longitudinal axis parallel with said first longitudinal axis and electrically conductive means passing along the second longitudinal axis of said ferrite body; said electrically conductive means having each of its ends electrically connected respectively to said terminal means and to said conductive connecting means to complete a separate circuit therebetween.

2. The electrical connector, as claimed in claim 1, wherein each said ferrite body is a hollow cylinder.

3. The electrical connector, as claimed in claim 1, wherein said connecting means is an elongate metal member and wherein each said body is disposed with its axis of rotation substantially along the direction of elongation of said metal member.

4. The electrical connector, as claimed in claim 1, wherein each said connecting means is an elongate metal member and wherein each said ferrite body is disposed with its axis of rotation substantially parallel to the direction of elongation of each said metal member.

5. The electrical connector, as claimed in claim 1, in the form of a male two-pin plug, said plug having a base carrying said terminal means and said connecting means and said devices, and a cover removably secured on said base.

6. An electrical connector comprising:

a male plug having two connecting pins and terminal means for attachment of a terminal lead;

said pins having a first longitudinal axis;

separate devices within said plug, each comprising a body of ferrite material having a second longitudinal axis parallel with said first longitudinal axis, each separate device having an electrically conductive elongated metal member passing along each said body;

each metal member having each of its ends electrically connected respectively to said terminal means and to one of said connecting pins to complete a separate circuit therebetween;

said plug having a base carrying said terminal means and a portion of said pins secured between said base and a cover.

7. An electrical connector for a thermocouple device comprising within a common housing:

a two wire lead connector, each wire being of a different metal and electrically attached to terminal means;

conductive connecting means for each lead having a longitudinal axis for engagement electrically with mating conductive means of an electrical component;

a device within said connector, comprising a separate body of ferrite material for each lead having an electrically conductive metal member passing along said body in parallel with said longitudinal axis and having each of its ends electrically connected respectively to said terminal means and to said conductive connecting means to complete a separate circuit for each wire lead.

8. A connector as in claim 7 in which the ferrite bodies are spaced apart from each other.

9. A connector as in claim 7 in which each ferrite body is tubular.

* * * * *